Nov. 29, 1938.   H. BECKER   2,138,059
PHOTOGRAPHIC CAMERA
Filed Dec. 20, 1935

Helmut Becker
INVENTOR
BY Hans E. G. Konigsberg
ATTORNEY

Patented Nov. 29, 1938

2,138,059

UNITED STATES PATENT OFFICE 2,138,059

PHOTOGRAPHIC CAMERA

Helmut Becker, Wetzlar, Germany, assignor to Ernst Leitz, G. m. b. H., Wetzlar, Germany Application December 20, 1935, Serial No. 55,360
In Germany December 22, 1934

2 Claims.  (Cl. 95—44)

This invention relates to photographic cameras of the type in which a plurality of removable objectives are operatively connected by gears or other means whereby simultaneous focusing of all the objectives is accomplished when one of them is focused. In such a construction it is obvious that each objective must be provided with a gear or the like. The object of the invention is to provide a construction in which the focusing gears or other members for the same purpose remain attached to the camera and only the objectives themselves need to be made removable. This is a decided advantage. Another feature of the invention includes the exchangeability of objectives in such a manner that as an objective is moved out of photographing position and displaced by another objective, such other objective is automatically brought into operative relation with the range finder of the camera. In the drawing accompanying this specification—

Figure 1:
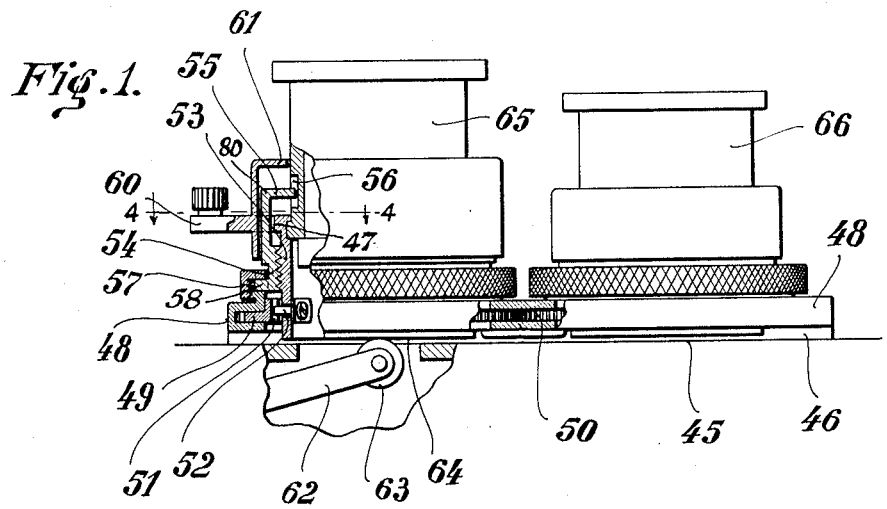
Fig. 1 is a view of a camera having two objectives embodying the features of the invention. Parts are broken away and parts are in section on the line 1—1 of Figure 4.

Referring to the drawing the reference numeral 45 denotes the camera upon which there is mounted a slidable objective carrier 46 which supports the gears by means of which the objectives are simultaneously focused. An objective is removed by detaching it from its focusing gear which remains upon the carrier 46. The construction is as follows. The carrier 46 has secured thereto a bearing 48 which encloses and supports the focusing gears 49 and 50 in meshing relation, there being one gear for each of the objectives 65 and 66. The construction is alike for the two objectives so only one will be described. The second objective 66 is shown only in outline. The objective 65 has fixed thereto a focusing ring 53 which carries a pin 52. The latter fits into a slot 51 in the gear 49 whereby the objective and the gear are brought into operative relation. When the objective 65 is rotated for focusing purposes, the pin 52 rotates the gear 49 and of course the other gear 50 is likewise rotated to focus the other objective 66.

Figure 3:
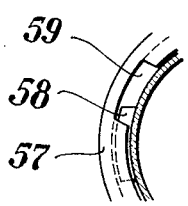
Fig. 3 is a detail view of parts shown in Figures 1 and 2.
Figure 4:
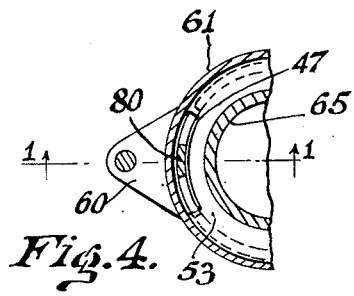
Fig. 4 is a fragmentary detail sectional view taken on the line 4—4 in Figure 1.

The objective focusing ring 53 is screwed into and out of a fixed objective carrier 54. The carrier is secured to the bearing 48 by a clamping ring 57 screwed upon the bearing. The carrier 54 is provided with teeth 58 which engage the clamping ring 57 through cut out portions 59 in a well known manner illustrated in Figure 3. The rotatable focusing ring 53 has an actuating lever 60 in one piece with a protecting sleeve 61. The objective carrier 54 has an upstanding lug 80 which projects through an arcuate slot 47 in the focusing ring 53 so that the ring and the objective can be rotated sufficiently to cause the slight axial movement of the objective which is necessary to focus the same. The axial movement of the objective is guided and limited by the upstanding lug 80 which engages in a recess 56 in the objective as shown. A range finder is indicated by its usual operating lever 62 and roller 63 which engages the inner end of the objective as usual.

The position of the parts when assembled for operation is as shown in Figure 1 in which the focusing ring 53 together with the objective 65 may be rotated within the objective carrier 54 by actuating the lever 60.

When it is desired to remove the objective 65 the clamping ring 57 is loosened by unscrewing, the carrier ring 54 is disengaged from the clamping ring 57 by turning the ring until the teeth 58 on the carrier can pass out of the cut out portions 59 in the clamping ring as will be understood and now the objective 65, the focusing ring 53, the objective carrier 54 with the lever 60 and protecting sleeve 61 are detached from the camera, the pin 52 sliding outwards in the gear slot 51. The said removable parts form one exchangeable unit. A similar other unit with a different objective may now be attached to the camera by securing the carrier element 54 of such other unit to the clamping ring 57 by the bayonet joint connection 58—59 described above and then tightening the clamping ring 57.

Figure 2:
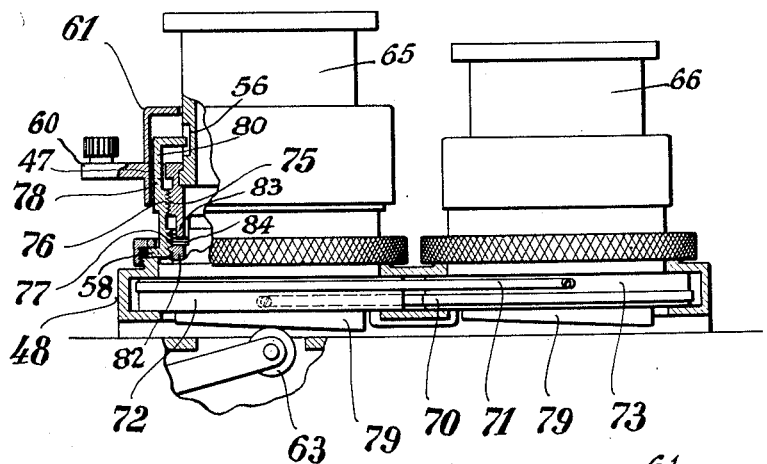
Fig. 2 is a view similar to Figure 1 but showing a modified construction.

Figure 2 illustrates a modification of the construction in Figure 1. The aforesaid gears 49 and 50 are replaced by cross connected ribbons 70 and 71 connected to rings 72 and 73 which correspond to the gears 49 and 50. When the objectives are focused the one ribbon winds up and the other unwinds. The construction in Figure 2 is like the construction in Figure 1 with the exception that in Figure 2 the focusing ring consists of two parts 75 and 82 which are operatively connected by a tooth 83 on the upper part 75 which engages a notch 84 in the lower part 82. The latter carries a cam 79 for operating the range finder arm. The two parts 75 and 82 have threads of different pitches which engage corresponding threads 76 and 77 in the objective carrier 78. When the objective is focused the two parts 75 and 82 of the objective focusing ring rotate together with the objective and at the same time they have a differential axial movement whereby to compensate for the different focal lengths of different objectives. The part 82 engages the ring 72 by a pin and slot connection similar to that shown at 51—52 in Fig. 1. This detail is not shown in Fig. 2, same being a mere obvious duplication. In Fig. 2 as well as in Fig. 1 the objective unit comprising the carrier 78, the objective 65 and its focusing ring 75, 82 is removed by loosening the clamping ring and disengaging the objective carrier therefrom by unlocking the bayonet joint connection. Thereafter the entire objective unit is lifted and removed from the ring 72 in Fig. 2.

I claim:

1. In a photographic camera including a range finder having an operating arm, a plurality of removable objective units, each unit comprising an objective carrier and an objective in threaded engagement with said carrier together with means for rotating the objective in the carrier for focusing purposes; a movable support carrying the objectives secured to the camera for selectively placing any one of the said objective units in photographing position on the camera and in operative relation to said range finder operating arm, gears on said movable support for simultaneously focusing all the objectives in said units when the latter are secured to the movable support, means for detachably coupling the objective units to the movable support, said coupling means comprising for each unit a clamping ring for nonrotatably securing the objective carrier to the movable support and for placing the inner end of the objective in said carrier in contacting operative engagement with the said range finder operating arm and cooperating means on the objective and its focusing gear on the movable support for detachably operatively connecting the objective to the gear.

2. A device according to claim 1 characterized by cooperating means on the objective carrier and on the objective focusing ring for operating the latter in said carrier to focus the objective whereby to compensate for different focal lengths of different objectives.

HELMUT BECKER.